US012564127B1

(12) United States Patent
    Cheatham

(10) Patent No.: US 12,564,127 B1
(45) Date of Patent: Mar. 3, 2026

(54) RIDING LAWN MOWER WITH AN AIR CONDITIONED CAB

(71) Applicant: Emanuel Cheatham, Groveland, FL (US)

(72) Inventor: Emanuel Cheatham, Groveland, FL (US)

( * ) Notice: Subject to any disclaimer, the term of this patent is extended or adjusted under 35 U.S.C. 154(b) by 962 days.

(21) Appl. No.: 17/692,342

(22) Filed: Mar. 11, 2022

(51) Int. Cl.
    *A01D 34/00*      (2006.01)
    *A01D 34/66*      (2006.01)
    *A01D 34/82*      (2006.01)
    *B60H 1/00*       (2006.01)
    *B60H 1/24*       (2006.01)
    *A01D 101/00*     (2006.01)

(52) U.S. Cl.
    CPC ........... *A01D 34/001* (2013.01); *A01D 34/66* (2013.01); *A01D 34/82* (2013.01); *A01D 2101/00* (2013.01); *B60H 1/00564* (2013.01); *B60H 1/0065* (2013.01)

(58) Field of Classification Search
    CPC ...... A01D 34/001; A01D 34/66; A01D 34/82; B60H 1/00564; B60H 1/0065; B60H 1/3222; B60H 1/00407; B60N 3/103
    See application file for complete search history.

(56)                 References Cited

U.S. PATENT DOCUMENTS

| 5,165,646 | A | * | 11/1992 | Gewecke | ............... | B60N 3/103 |
| | | | | | | 165/80.1 |
| 5,842,732 | A | | 12/1998 | Daggett et al. | | |
| 8,056,617 | B2 | | 11/2011 | Klassen et al. | | |
| 8,360,084 | B1 | * | 1/2013 | Robinson | ................ | E04H 6/005 |
| | | | | | | 135/133 |
| D723,451 | S | * | 3/2015 | Depew, Jr. | ................... | D12/401 |
| 10,259,287 | B2 | * | 4/2019 | Reynolds | ........... | B60H 1/00407 |
| 2017/0203804 | A1 | * | 7/2017 | Haines | ................... | B62K 5/007 |
| 2019/0118611 | A1 | * | 4/2019 | Reynolds | ............. | B60H 1/3222 |

* cited by examiner

*Primary Examiner* — Joseph M Rocca
*Assistant Examiner* — Robert E Pezzuto
(74) *Attorney, Agent, or Firm* — Sanchelima & Associates, P.A.; Christian Sanchelima; Jesus Sanchelima

(57)                 ABSTRACT

A riding lawn mower with an air conditioned cab including a riding lawn mower assembly, a cabin assembly and an air conditioned system. The riding lawn mower assembly includes a riding lawn mower. The cabin assembly includes a cabin with a semi-spherical shape. The cabin is transparent. The cabin is a retractable cabin. The cabin can be retracted to allow access to the interior of the cabin. The cabin can be extended to isolate interior of the riding lawn mower from the interior. The cabin is mounted to the riding lawn mower. The air conditioned system assembly includes air conditioned vents integrated to the riding lawn mower for cooling an interior of said cabin.

4 Claims, 4 Drawing Sheets

RIDING LAWN MOWER WITH AN AIR CONDITIONED CAB

BACKGROUND OF THE INVENTION

1. Field of the Invention

The present invention relates to riding lawn mower with an air conditioned cab and, more particularly, to a riding lawn mower with an air conditioned cab that includes a cabin and an air conditioning and ventilation system for cooling the interior of the cabin.

2. Description of the Related Art

Several designs for riding lawn have been designed in the past. None of them, however, include a riding lawn that includes an air conditioned cab with a semi spherical shape.

Applicant believes that a related reference corresponds to U.S. Pat. No. 8,056,617 issued for an HVAC system for a work vehicle comprising an enclosed cab. Applicant believes that another related reference is U.S. Pat. No. 5,842,732 issued for a riding lawn mower comprising a covered canopy. None of these references, however, teach of a riding lawn mower with an air conditioned cab that includes a transparent bubble shaped cab wherein an air conditioning and ventilation system is mounted on the lawn mower for cooling the interior of the cabin.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a riding lawn mower with an air conditioned that includes a transparent bubble that can protect a user from the environment.

It is another object of this invention to provide a riding lawn mower with an air conditioned cabin that includes an air condition system for cooling the interior of the cabin preventing heat strokes.

It is still another object of the present invention to provide a riding lawn mower with an air conditioned cabin that makes cutting grass an activity safer and more comfortable.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
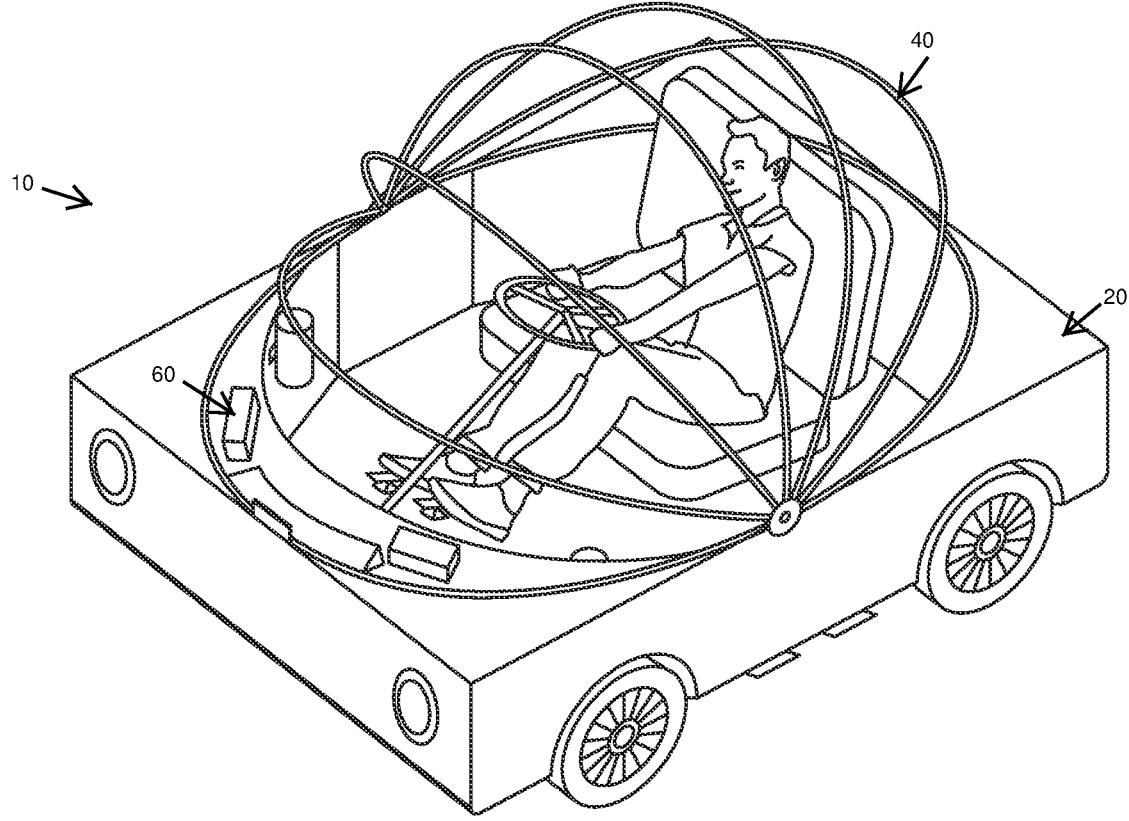
FIG. 1 represents an isometric operational view of one of the preferred embodiments of the present invention 10 showing a user inside the cabin assembly 40.
Figure 2:
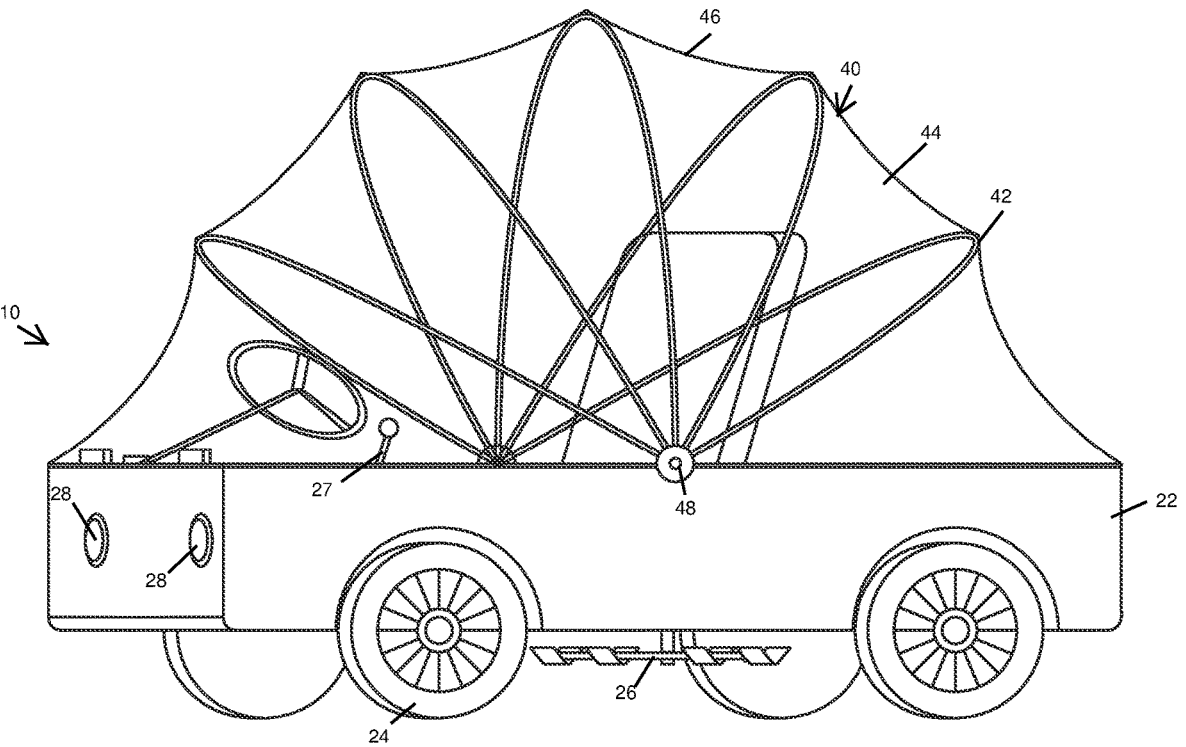
FIG. 2 shows a lateral side view of the present invention 10 showing the blades 26 mounted to a top portion of the frame 22.
Figure 3:
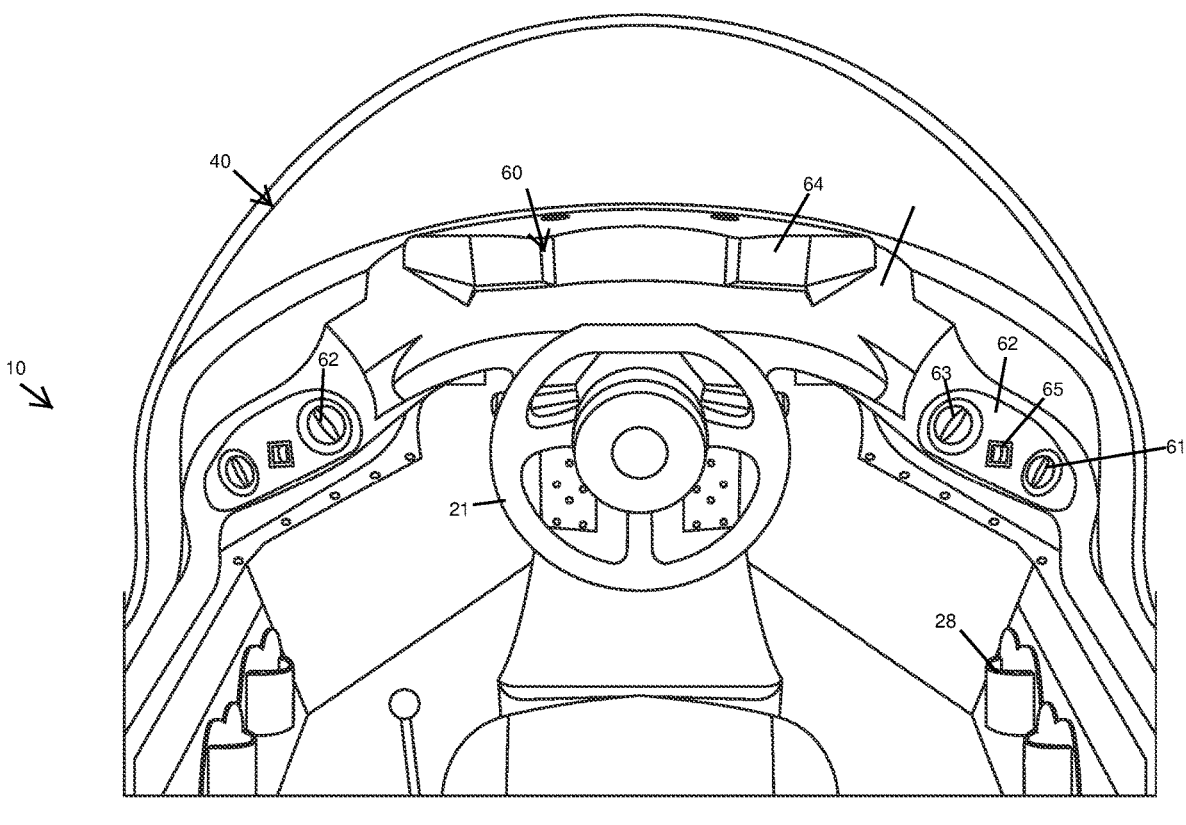
FIG. 3 illustrates an interior of the cabin showing air conditioned assembly 60.

Referring now to the drawings, where the present invention is generally referred to with numeral 10, it can be observed that it basically includes riding lawn mower assembly 20, cabin assembly 40 and air conditioned assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Riding lawn mower assembly 20 may include frame 22, seat 23, wheels, 24, pedals 25, and blades 26. In one embodiment, frame 22 may have a cuboid shape. It should be understood that frame 22 may have an oval shape, a triangular shape, a spheric shape, a polygonal shape, an irregular shape or any other suitable shape. Frame 22 may include a front side substantially rectangular. Front side of the frame 22 may have other shapes such as but not limited to circular shape, spheric shape, oval shape, rounded shapes, or any other shape.

Frame 22 may have any suitable size for receiving at least one user. Frame 22 may be made of carbon fibers, an alloy of iron, magnesium, aluminum, or any other material with high resistance. It may be suitable to have frame 22 with a protective coating to avoid corrosion and damage of frame 22. Sides of frame 22 may have cuts with curved shape or any other shape to receive wheels 24. In one embodiment, frame 22 may have four wheels 22. It may be suitable to have frame 22 with less than four wheels 24 or more than four wheels 24. Wheels 24 may include tires 24a made of rubber or any other suitable material. Wheels 24 may be mud-terrain tires or any other suitable type of wheel suitable for a riding lawn mower. Riding lawn mower 20 further includes steering wheel 21 operatively connected to wheels 24 to control direction of wheels 24. Steering wheel 21 may be mounted on the dashboard 29 of the frame 22. It should be understood that riding lawn mower assembly 20 may include any suitable of steering mechanism known in the prior art.

Seat 23 may be located on interior of the frame 22. Seat 23 may include a cushion pad for comfort. Blades 26 may be operatively connected by a lever 27. Lever 27 may be located on interior of frame 22 next to the seat 23. Blades 26 may be located on a bottom side of frame 22. Blades 26 may rotate for trimming lawn. Blade 26 may be standard blades, low lift blades, high lift blades, mulching blades or any other kind of blade suitable for a riding lawn mower known in the prior art. Lever 27 may control speed of rotation of blades 26 for trimming. Pedals 25 may be located on interior of the frame 22. Pedals 22 may control speed of wheels. Riding lawn mower 20 may further include at least one cup holder 28 attached to an interior of a sidewall of the frame 22. The at least one cup holder 28 may be made of plastic, leather, wood, a metal or any other suitable material.

Riding lawn mower 20 may further include lights 28 located on front side of the frame 22. Lights 28 may have a circular shape, rectangular shape, triangular shape, oval shape, or any other shape. Frame 22 may have multiple lights 28. It should be understood that lights 28 may be placed on each wall of the frame 22. Lights 28 may be incandescent lamps, fluorescent lamps, Light Emitting Diode, fluorescent tubes, neon lamps, or any other variation thereof. Lights 28 may be powered by alternating current or direct current. Lights 28 may improve visibility for the riding lawn mower assembly 20.

Cabin assembly 40 may include latches 41, support members 42, cover 46 and fastener 48. Preferably, support members 42 may have a shape of an arc. Support members 42 may be made of a hard plastic, a metal, carbon fibers of the like. Support members 42 may be pivotally connected to an upper middle portion of sidewalls of frame 22. A rear support member 42a may be permanently secured to a rear portion of frame 22.

Figure 4:
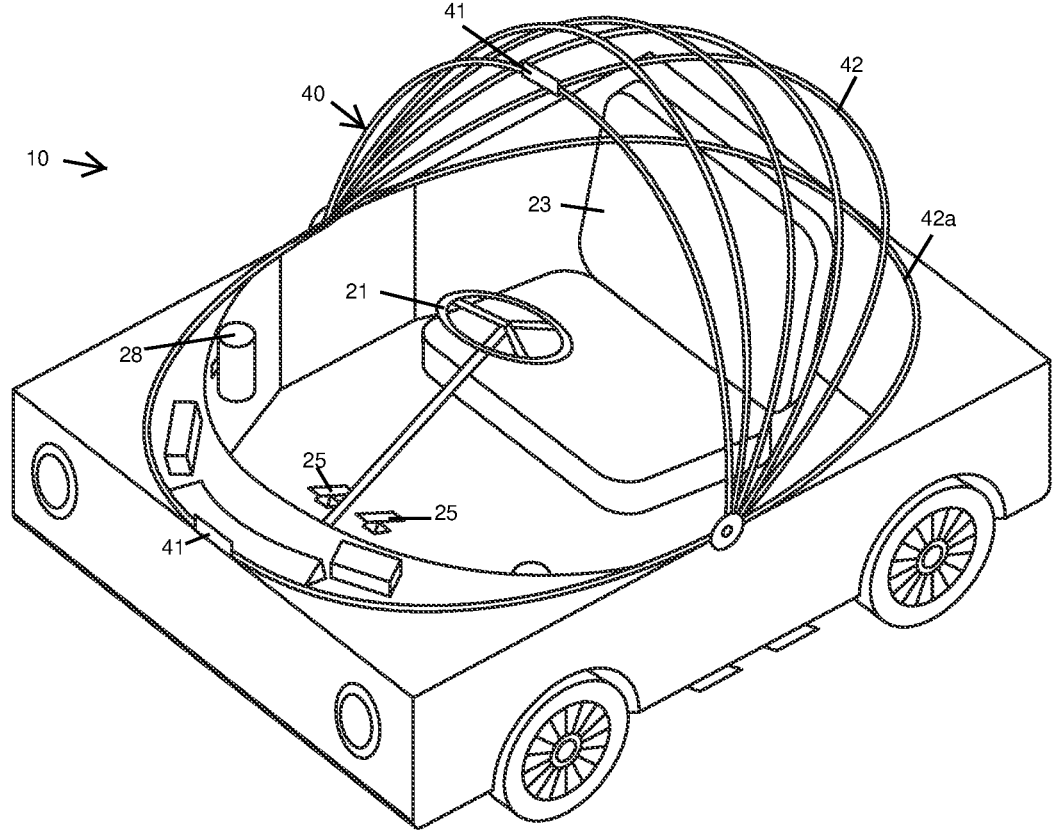
FIG. 4 is a representation of an isometric view of the present invention 10 showing the cabin assembly 40 in an alternative configuration.

Cover 46 may be transparent. It also may be suitable to have cover 46 partially transparent and partially opaque, with a transparent portion that allows user to see through it. Cover 26 may be made of plastic. Cover 26 may include a light polarized coating to filter frequencies and orientations of light rays such as ultra-violet rays that are harmful to people. Cover 46 may have shape of a bubble. Cover 46 may be attached to support members 44 leaving a space between each of the support members, thereby defining cabin 44. A rear portion of cover 46 may be permanently secured to frame 22 and to rear support member 42a. Cabin 44 may be foldable and retractable as shown in FIG. 4 to allow access to interior of cabin 44. Cabin 44 may be closed and secured to front of frame 22 via latches 41. Latches 41 may be magnetic latches, snaps, buttons, or any other suitable kind of latch known in the prior art. Cabin 44 may let water runs out when raining.

Air conditioned assembly 60 may include controls 62 and vents 64. Controls 62 may include temperature control 61, intensity control 63 and switch 65. Controls 62 may be integrally mounted to the dashboard 29. Vents 64 may be located on a top portion of the dashboard 29. Switch 65 may turn on or off the vents 64 for providing cool air into the cabin 44 for cooling down the interior of cabin 44. Temperature control 61 may control the temperature of the cool air. Intensity controls 63 may control the temperature of the cool air into the cabin.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A riding lawn mower with an air conditioned cab, comprising:

A) a rectangular riding lawn mower assembly including the riding lawn mower, said riding lawn mower has an oval riding cab which is an interior area of the riding lawn mower designed for a driver, wherein the oval riding cab has a seat, a steering wheel and a dashboard;

B) a cabin assembly including a cabin, said cabin is transparent, said cabin has a semi-spherical shape, said cabin is mounted to the riding lawn mower; wherein said cabin comprises a series of arched ribs connected to a pivoting distal end located on lateral sides of a top periphery of the rectangular riding lawn, wherein said arched ribs form an enclosure when closed; wherein a transparent membrane is attached to a top portion of each arched rib; wherein frontmost arched ribs from the arched ribs have a latch on a central portion thereof, said latch secures the cabin in closed configuration; and C) an air conditioned assembly including vents integrated to the riding lawn mower for cooling an interior of said cabin; wherein said vents are formed on an upper portion of the dashboard of the riding lawn mower and wherein said vents face towards said seat; wherein said air conditioned assembly further includes controls comprising: a temperature control, an intensity control and a switch; wherein said controls are located on a right-hand side of the dashboard; wherein said controls are configured to adjust temperature and intensity of air supplied in the oval riding cab.

2. The riding lawn mower with an air conditioned cab of claim 1, wherein said riding lawn mower assembly further comprises a frame.

3. The riding lawn mower with an air conditioned cab of claim 2, wherein said frame has at least one cup holder attached.

4. A riding lawn mower with an air conditioned cab, consisting of:

A) a rectangular riding lawn mower including blades, a lever a frame, a seat, a dashboard, wheels and a steering wheel, the wheels are operationally connected to the steering wheel, the steering wheel controls direction of the wheels, the steering wheel is mounted to a top portion of the dashboard, the seat is located on the frame, the blades are mounted to a bottom portion of the frame, the blades are operatively connected to the lever, the lever is configured to control speed of the blades, the riding lawn mower assembly further includes at least one cup holder; said riding lawn mower has an oval riding cab which is an interior area of the riding lawn mower designed for a driver;

B) a cabin assembly including a cabin, said cabin is transparent, said cabin has a semi-spherical shape, said cabin is mounted to the riding lawn mower; wherein said cabin comprises a series of arched ribs connected to a pivoting distal end located on lateral sides of a top periphery of the rectangular riding lawn, wherein said arched ribs form an enclosure when closed; wherein a transparent membrane is attached to a top portion of each arched rib; wherein frontmost arched ribs from the arched ribs have a latch on a central portion thereof, said latch secures the cabin in closed configuration; and C) an air conditioned assembly including vents integrated to the dashboard of the riding lawn mower for cooling an interior of said cabin; wherein said vents are formed on an upper portion of the dashboard of the riding lawn mower and wherein said vents face towards said seat; wherein said air conditioned assembly further includes controls comprising: a temperature control, an intensity control and a switch; wherein said controls are located on a right-hand side of the dashboard; wherein said controls are configured to adjust temperature and intensity of air supplied in the oval riding cab.

* * * * *